(12) United States Patent
Stienhans et al.

(10) Patent No.: US 8,190,740 B2
(45) Date of Patent: *May 29, 2012

(54) SYSTEMS AND METHODS FOR DYNAMICALLY PROVISIONING CLOUD COMPUTING RESOURCES

(75) Inventors: Frank Stienhans, San Carlos, CA (US); Michael Klimentiev, Belmont, CA (US)

(73) Assignee: SAP AG, Walldorf, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/166,689

(22) Filed: Jun. 22, 2011

(65) Prior Publication Data

US 2011/0252137 A1    Oct. 13, 2011

Related U.S. Application Data

(63) Continuation of application No. 12/347,781, filed on Dec. 31, 2008, now Pat. No. 7,996,525.

(51) Int. Cl.
*G06F 15/173* (2006.01)
(52) U.S. Cl. ........................ 709/224; 709/226
(58) Field of Classification Search .................. 709/223, 709/224, 226, 228
See application file for complete search history.

(56) References Cited

U.S. PATENT DOCUMENTS

2004/0243650 A1* 12/2004 McCrory et al. ............. 707/203
2009/0300210 A1* 12/2009 Ferris .......................... 709/235

OTHER PUBLICATIONS

Amazon Web Services (TM) "Amazon Elastic Compute Cloud", Developer Guide, API Version Aug. 8, 2008.

* cited by examiner

*Primary Examiner* — Joseph Avellino
*Assistant Examiner* — Marshall McLeod
(74) *Attorney, Agent, or Firm* — Fountainhead Law Group PC

(57) ABSTRACT

In one embodiment the present invention includes a computer-implemented method comprising specifying configuration information for creating one or more software servers as images on a cloud computing system, specifying a processing load threshold, and continuously monitoring a processing load on one or more software servers. If the monitored load exceeds the processing load threshold, a request to the cloud computing system may be generated to instantiate an instance of one of said images. The method further includes creating a server instance on the cloud in response to the request, distributing the processing load across the one or more servers and the server instance, and monitoring the processing load on the one or more servers and the server instance.

12 Claims, 8 Drawing Sheets

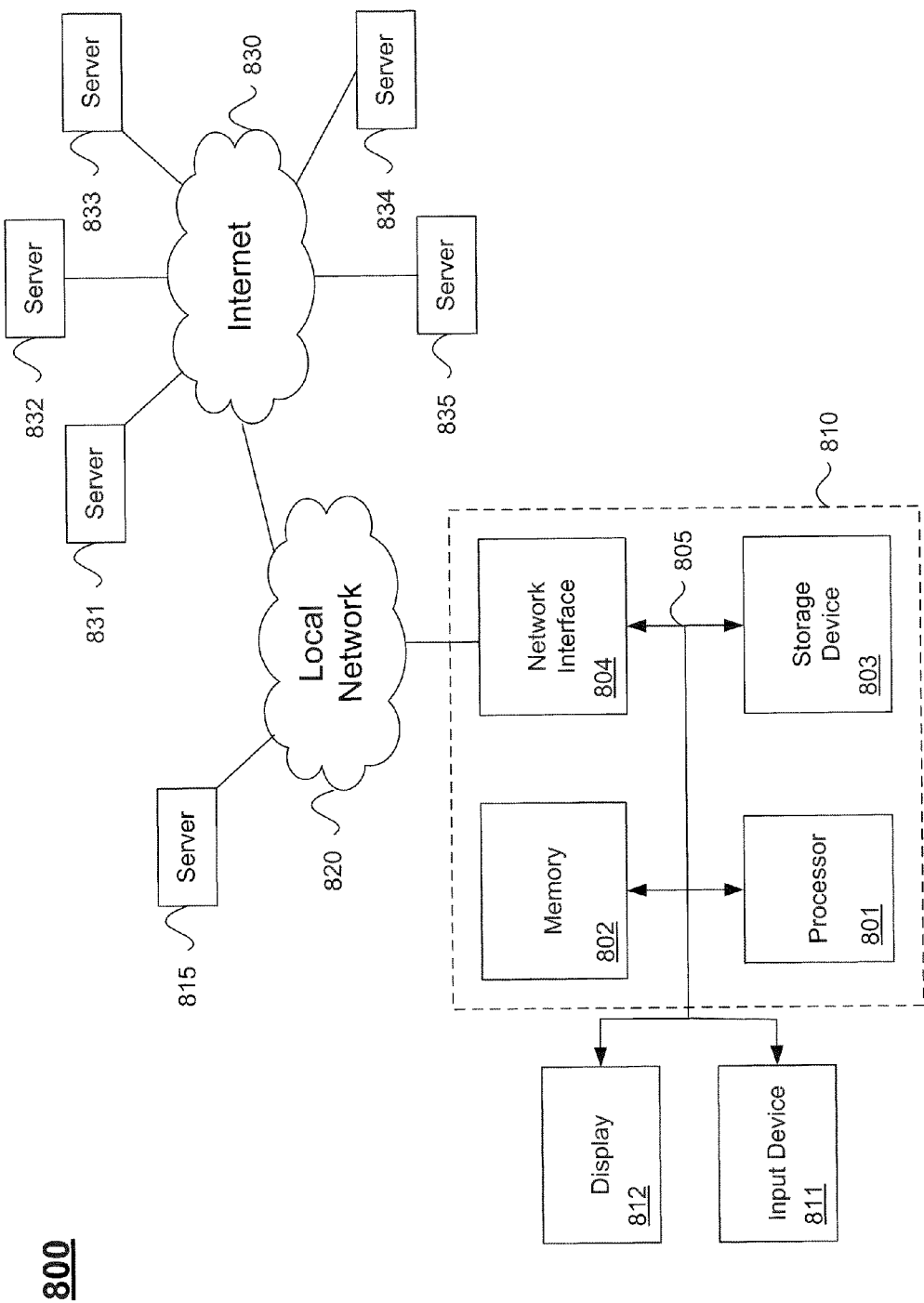

SYSTEMS AND METHODS FOR DYNAMICALLY PROVISIONING CLOUD COMPUTING RESOURCES

CROSS REFERENCE TO RELATED APPLICATIONS

This application is a continuation of and claims the benefit of U.S. patent application Ser. No. 12/347,781, filed Dec. 31, 2008, entitled "Systems and Methods for Dynamically Provisioning Cloud Computing Resources," naming Frank Stienhans and Michael Klimentiev as inventors, the contents of which is hereby incorporated herein by reference in its entirety.

BACKGROUND

The present invention relates to computing, and in particular, to a systems and methods for dynamically provisioning computing resources.

In general, the concepts of "virtual" and "cloud computing" includes the utilization of a set of shared computing resources (e.g., servers) which are typically consolidated in one or more data center locations. For example, cloud computing systems may be implemented as a web service that enables a user to launch and manage computing resources (e.g., virtual server instances) in third party data centers. In a cloud environment, computer resources may be available in different sizes and configurations so that different resource types can be specified to meet specific needs of different users. For example, one user may desire to use small instance as a web server and another larger instance as a database server, or an even larger instance for processor intensive applications. Cloud computing offers this type of outsourced flexibility without having to manage the purchase and operation of additional hardware resources within an organization.

A cloud-based computing resource is thought to execute or reside somewhere on the "cloud", which may be an internal corporate network or the public Internet. From the perspective of an application developer or information technology administrator, cloud computing enables the development and deployment of applications that exhibit scalability (e.g., increase or decrease resource utilization as needed), performance (e.g., execute efficiently and fast), and reliability (e.g., never, or at least rarely, fail), all without any regard for the nature or location of the underlying infrastructure.

A number of factors have given rise to an increase in the utilization of cloud computing resources. For example, advances in networking technologies have significantly improved resource connectivity while decreasing connectivity costs. Advances in virtualization technologies have increased the efficiency of computing hardware by improving scalability and making it possible to more closely match computing hardware resources to the requirements of a particular computing task. Additionally, virtualization technologies commonly deployed in cloud computing environments have improved application reliability by enabling failover policies and procedures that reduce disruption due to an application or hardware failure.

A variety of different computing resources may be created on a cloud. For example, a resource may include all the information necessary to run application software, and may include UNIX, Linux, or Windows operating systems and specific application software as desired by a user. The information for configuring the resource to be created is referred to as an image. After an image has been created (instantiated), the resource becomes an instance (a server instance).

FIG. 1 illustrates a typical cloud computing architecture. A service requestor 104 may desire to use computing resources available on the cloud 102. As mentioned above, physically, the cloud may be one or more physical computer networks (e.g., server farms) accessible over the Internet, for example, with software for creating resource images and instances desired by users. One such cloud computing system is offered by Amazon.com®. Before a cloud computing resource can be created and used, a user must typically configure the particular resource. For example, in the case of a virtual server or virtual appliance, a user must configure the server or appliance and provision a physical server to execute the virtual server or appliance. Service requestor 104 may send messages to a cloud management system 103 to create or access configuration information for creating resources on cloud 102. In response to such messages, cloud management system 103 may configure a virtual server or virtual appliance for use by a requesting user. As illustrated in FIG. 1, the cloud management system 103 may act as an interface, whereby one or more users may setup resources on the cloud. For example, cloud management system 103 may facilitate web-based access to various administrative functions thereby enabling the user to configure the cloud-based resource using a conventional web browser application. For instance, the management system 103 may display to the user a list of resources or services that the user can utilize, along with a list of commands (e.g., start, stop, suspend, list) that can be executed to operate on, or with, certain resources. As mentioned above, the cloud-based resources may comprise, for example, a list of preconfigured or customized machine images corresponding to virtual servers that can be instantiated in the cloud. The management systems may manage the available resources, including the physical servers.

As illustrated in FIG. 1, cloud management system 103 may use configuration data 105 for setting up computing resources for different users. The configuration data may specify the details of the computing resources to be allocated, such as the image to be instantiated and the amount of computing resources to be applied. For instance, a user may upload a customized machine image or select a pre-configured machine image. The management system may store configuration data 105 in a repository, for example. When the user desires to use the resources, the system may generate the necessary commands for instantiating the virtual server on the appropriate physical server. For example, if a user desires a small amount of resources, the user may direct management system 103 to access configuration data specifying an image including a virtual CPU having a certain processing power and specifications, 1 GB of memory, and 100 GB of persistent storage. However, if the user desires a large amount of resources, the user may direct management system 103 to access configuration data specifying an image including multiple virtual CPUs having a certain processing power, 10 GB of memory, and 500 GB of persistent storage. The images are used to create server instances of the specified resources. Once the resources are instantiated, a link to the resources is sent to the user (e.g., an IP address) and the user may access the resources to run software applications as desired.

There are a number of problems with the existing tools and techniques for provisioning resources in a computing cloud. First, conventional cloud management systems provide no easy way for a user to integrate remote cloud-based resources with existing corporate or enterprise infrastructure. In particular, as additional resources are needed, existing techniques for instantiating new resources are inefficient and time consuming. For example, if a server cluster requires additional resources, existing techniques require that the system be shut down and reconfigured with new resources. Similarly, as instantiated resources become underutilized, existing techniques for automatically de-instantiating existing resources, as those resources are no longer needed, are similarly inefficient and time consuming Consequently, there exists a need for improved systems and methods for dynamically provisioning computing resources.

SUMMARY

Embodiments of the present invention include systems and methods for dynamically provisioning a computer system. In one embodiment, the present invention includes a computer-implemented method comprising specifying configuration information for creating one or more software servers as images on a cloud computing system, specifying a processing load threshold, continuously monitoring a processing load on one or more software servers, generating a request to the cloud computing system to instantiate an instance of one of said images if the monitored load exceeds the processing load threshold, creating a server instance on the cloud in response to the request, distributing the processing load across the one or more servers and the server instance, and monitoring the processing load on the one or more servers and the server instance.

In one embodiment, the one or more servers form a logical network, and wherein the created server instance becomes part of the logical network.

In one embodiment, the distributing is performed by a load balancer.

In one embodiment, the method further comprises repeating the generating, creating, and distributing steps.

In one embodiment, the method further comprises specifying a second processing load threshold, generating a second request to the cloud computing system to de-instantiate the server instance if the monitored load is below the second processing load threshold, and suspending the server instance on the cloud in response to the request.

In one embodiment, the processing load is monitored separately on each server, and wherein distributing the processing load across the one or more servers and the server instance is based on the monitored load of the one or more servers and the processing load of the server instance.

In one embodiment, the request to the cloud computing system comprises an identification of a first server of said one or more servers, and wherein the identification is used to establish a connection between the server instance and the first server.

In one embodiment, the method further comprises registering the server instance with a first server of said one or more servers.

In one embodiment, a first server of said one or more servers includes state information for a plurality of users, the method further comprising moving state information for a first user from the first server to the server instance.

In one embodiment, the processes described herein may be stored on a computer readable medium embodying a computer program for performing one or more methods.

The following detailed description and accompanying drawings provide a better understanding of the nature and advantages of the present invention.

BRIEF DESCRIPTION OF THE DRAWINGS

FIG. 8 illustrates hardware of a special purpose computing machine configured with a dynamic provisioning process according to one embodiment of the present invention.

DETAILED DESCRIPTION

Described herein are techniques for dynamically provisioning computing resources. The apparatuses, methods, and techniques described below may be implemented as a computer program (software) executing on one or more computers. The computer program may further be stored on a computer readable medium. The computer readable medium may include instructions for performing the processes described below. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
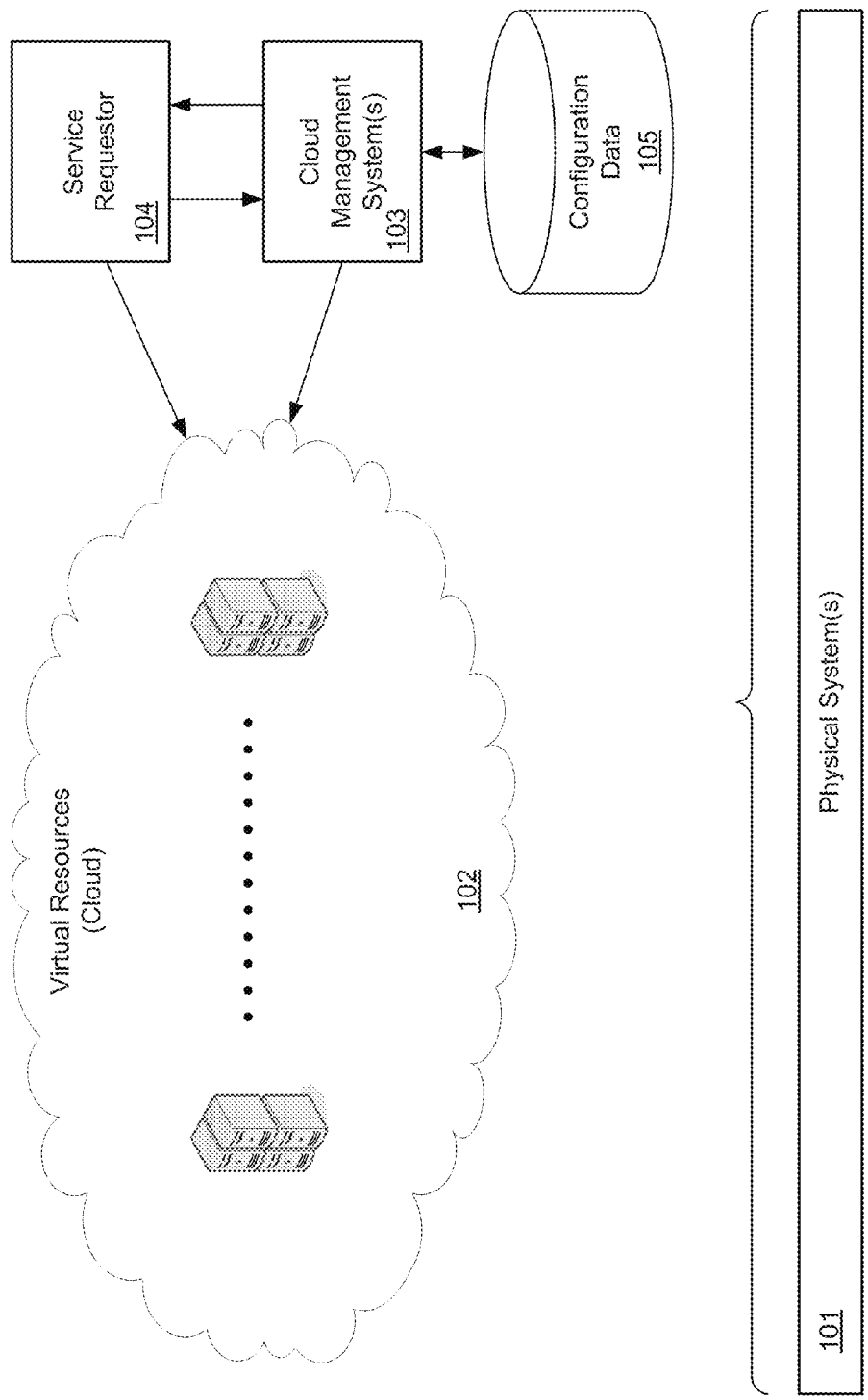
FIG. 1 shows an example cloud computing architecture.
Figure 2:
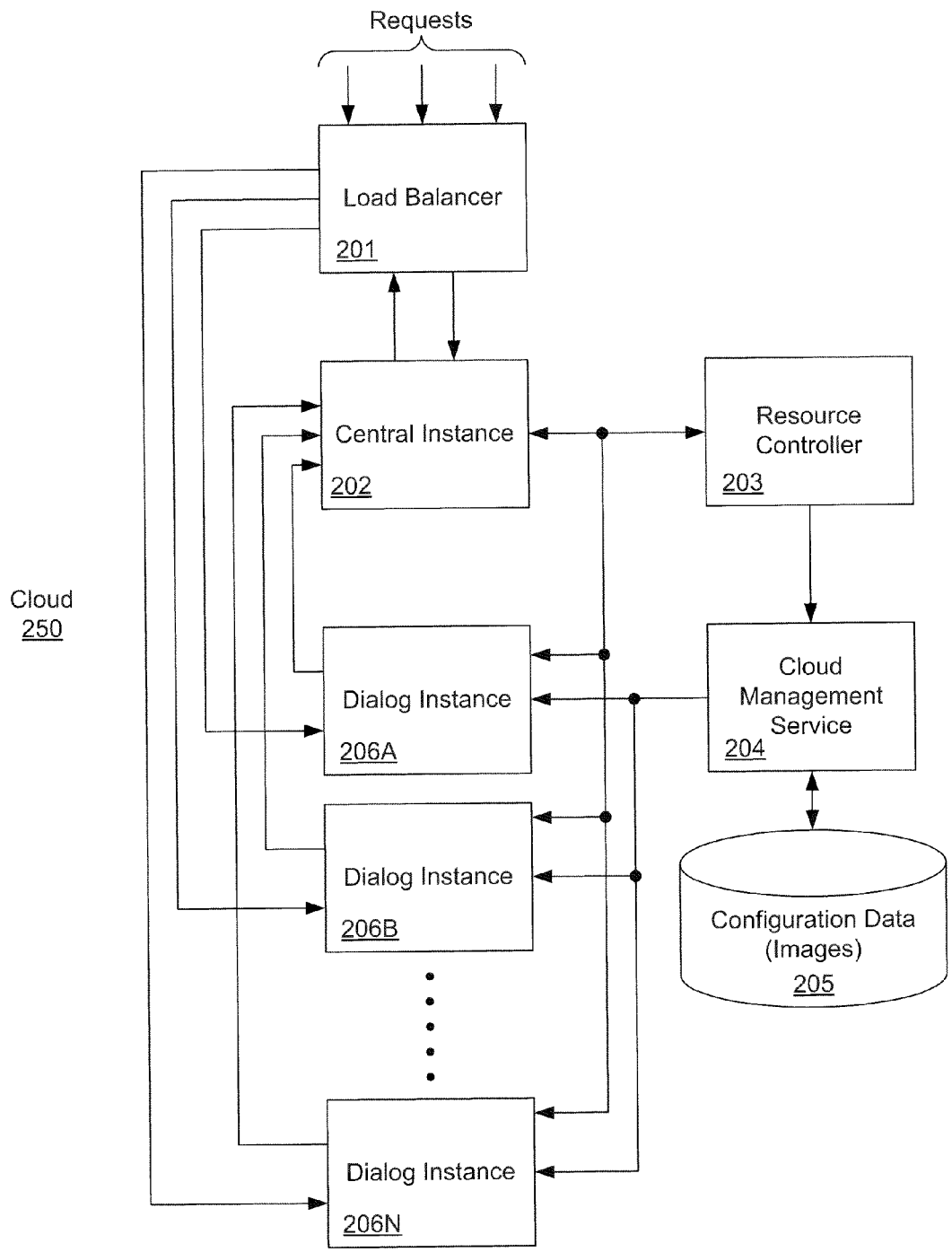
FIG. 2 illustrates dynamic provisioning according to one embodiment of the present invention.

FIG. 2 illustrates dynamic provisioning according to one embodiment of the present invention. Initially, a central instance of a server 202 may be up and running for processing information. In one embodiment, central instance server 202 is instantiated on the cloud system. However, in other embodiments, central instance 202 may be external to the cloud. Central server instance 202 may be an instance of a software server such as Netweaver by SAP AG®, for example. Central instance 202 software component may be used for processing requests generated by users or requests generated automatically by other software systems. Requests may be received by a load balancer 201, which may distribute the requests to one or more available servers. As the number of requests or the amount of processing increases, the available resources of central instance 202 may become overloaded. For examples, central instance 202 may run low on available CPU cycles for processing requests, available memory for storing final or intermediate results, or persistent storage for storing data. As the computing resources of central instance 202 approach full utilization, it may be desirable to automatically create one or more new instances of the server on a cloud computer system so that additional computing resources are available to handle processing requests.

Features and advantages of the present invention include software implemented processes and architectures for adding and configuring additional computing resources from a cloud dynamically (on-the-fly). As the load on a server grows, new instances are created automatically in the cloud to form a computing cluster (i.e., a logical network of software servers) for sharing the processing load and execution of requests. In one embodiment, a resource controller 203 software component is used to (e.g., among other things) monitor the load on the network so that new resources are created and brought on line as needed. In one embodiment, resource controller 203 is instantiated on the cloud system. In one example implementation, the resource controller 203 is included as a component of the central instance. However, in other embodiments, resource controller 203 may be external to the cloud.

Figure 3:
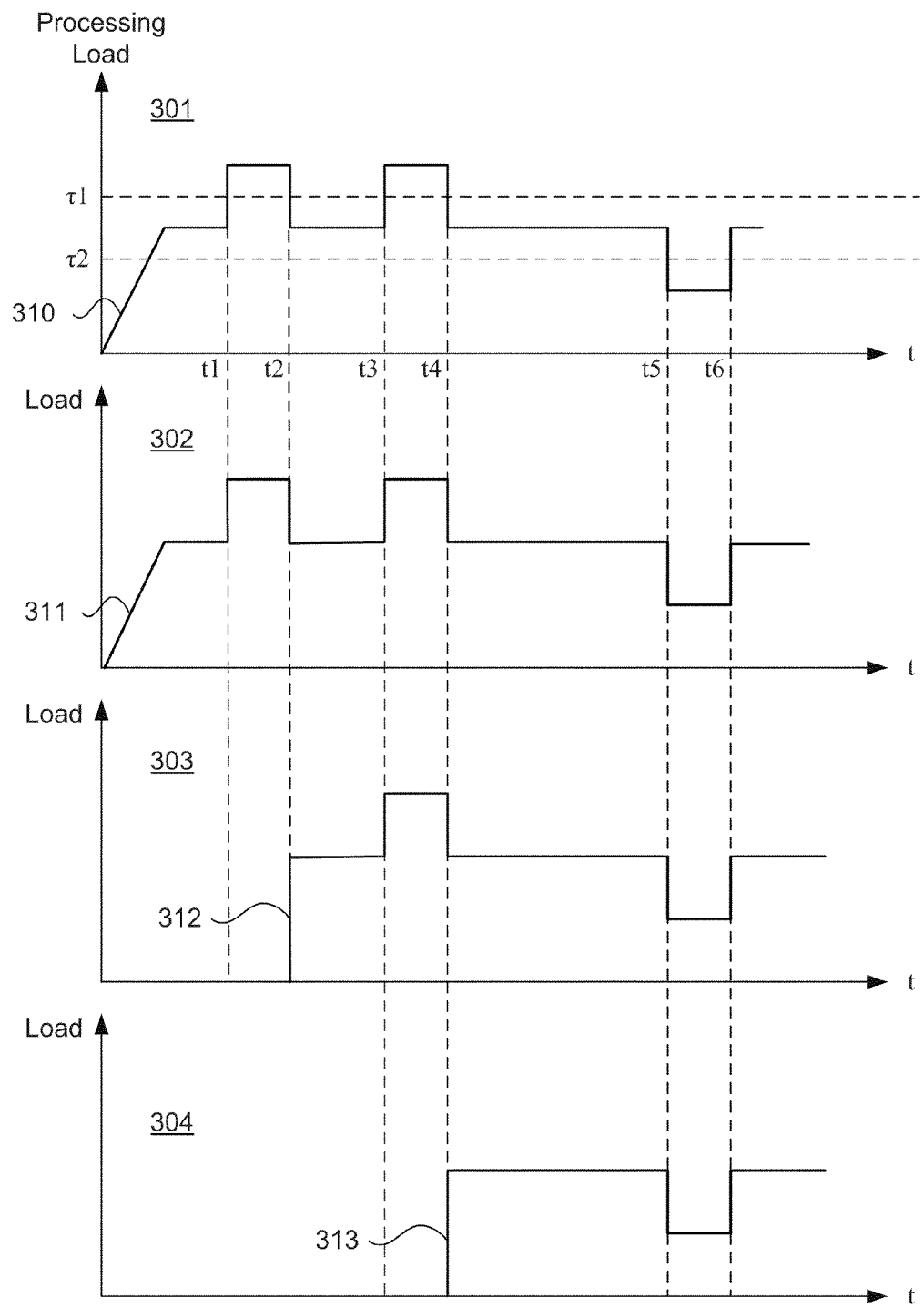
FIG. 3 illustrates the processing load of servers according to one embodiment of the present invention.

In the example shown in FIG. 2, requests are received in a load balancer 201. Load balancer 201 may forward the requests to a central server instance 202 for processing. Resource controller 203 may monitor the processing load of the central instance 202. FIG. 3 illustrates the processing load (or loading) of servers according to one embodiment of the present invention. A variety of metrics may be used to track processing load, such as the number of user requests received, CPU usage, memory usage, or combinations of metrics, for example. Plot 302 of FIG. 3 illustrates an example loading of the central server instance 202. It is to be understood that the loading illustrated in FIG. 3 is shown using linear changes over time—straight lines. However, actual loading will vary in a non-linear manner over time. Accordingly, these figures are to be taken as illustrative of the concepts only. The processing may increase at 311 after the server is started, for example, and reach some nominal value. At time, t1, the loading may increase, thereby approaching a maximum loading limit of the server. Plot 301 illustrates an example of the total loading of the central server 202 and other servers processing requests. For example, as the loading of server 202 increases in plot 302, the total loading illustrated in plot 301 likewise increases since server 202 is the only server processing requests prior to time t1 in this example. As illustrated in plot 301, a processing load threshold, τ1, may be specified (e.g., stored in resource controller 203). The processing load threshold may be used to trigger the creation (or instantiation) of new servers on cloud computing system 250 for processing. For example, resource controller 203 may monitor the total load of the server system. Initially, this means that resource controller 203 monitors the loading of central server 202. If the total loading increases above processing load threshold, τ1, then resource controller 203 may generate a request for more resources, which is sent to cloud computing system 250.

Cloud computing system 250 may include a cloud management service 204 (e.g., a web service) and configuration data 205. Cloud management service 204 may be a web service for interfacing with cloud 250. Configuration data 205 may be stored in one or more cloud accessible databases. The configuration information for one or more particular software servers, including information necessary to configure the servers as desired by a user, may be stored as an image on the cloud. In this example, if a request for additional resources is received by cloud management service 204 from resource controller 203, cloud management service 204 may access a specified image and instantiate the image to create a new server instance, referred to here as a dialog instance. The request may include parameters, such as image identifier (ID) to use for accessing a specific image in the cloud and instantiating the image into a dialog server instance. Additionally, the request to cloud management service includes parameters to be passed to a dialog instance on instantiation. Such parameters may include a network name of central instance for dialog instance to communicate with the central instance and credentials that allow the dialog instance to communicate with the cloud management service. Instance infrastructure of DI image will take care of the reset. In response to the request that is triggered by the load on central server 202 increasing above the specified processing load threshold, τ1, a new dialog server instance 206A is created from a corresponding image stored in the cloud.

After the dialog server instance 206A is created, the central server 202 and dialog server 206A may share the processing load. Features and advantages of the present invention may include one or more software servers, such as central server 202, and one or more servers on a cloud computer system 250 acting as one logical server network (a server cluster). Accordingly, after dialog server instance 206A is created, resource controller 203 establishes a connection with dialog instance 206A and begins to monitor the load of both central server 202 and dialog server 206A. Referring again to FIG. 3, plot 303 illustrates the processing load on dialog server 206A. As mentioned above, at time, t1, the total load on the system increases above the specified threshold. Accordingly, a request to generate dialog server 206A is generated at t1. At a later time, t2, dialog server 206A is instantiated using the configuration information (the image) on the cloud. A time period between time t1 and time t2 may include the time for the request to be sent from the resource controller to the cloud, execution of a filtering algorithm to eliminate temporary increases in the load (spikes), and initializing the dialog server.

In one example embodiment of the present invention, resource controller 203 may monitor the processing load of each active server and activate additional servers based on the loading of each server so that an aggregated loading on the logical network of servers does not exceed a threshold. For example, resource controller 203 may determine an average processing load based on the individual loads of each server. Plot 301 illustrates the average loading of the combined servers, which is representative of the total load of the combined server cluster. As illustrated in plot 301, when server 206A is activated at time t2, the average processing load for each server is reduced. In particular, a portion of the processing that was performed by central server 202 may be transferred to dialog server 206A or new processing requests may be processed by dialog server 206A instead of central server 202. Accordingly, the processing load of central server 202 is reduced at time t2 and the average processing load in plot 301 is reduced at time t2 to a value below the specified threshold, τ1.

In one embodiment, central server 202 operates as a master server and one or more dialog servers 206A operates as slave servers. Accordingly, central server 202 may coordinate shared processing across one or more dialog servers. For example, after a dialog server is instantiated, it may register with central server 202. As mentioned above, the dialog server receives the connection information for communicating with the central server as a parameter during instantiation. Dialog server may use this information to connect to the central server. Central server 202 may store a list (or registry) of active dialog servers running on the cloud, for example. The registry may include a list of dialog servers, the dialog server address, and operational status (e.g., ON/OFF, initializing, ready for processing, or shutting down) of each server, for example. Accordingly, after a dialog server is instantiated and registered with the central server 202, the central server 202 may send a notification to load balancer 201 that one or more dialog servers are available to process requests. For example, the central server 202 may send the connection information for the new dialog server (e.g., a URL and one or more port numbers) to the load balancer, and the load balancer may store the connection information in a list of available connections. As the load balancer receives requests, the requests may be automatically forwarded to each of the connections in the list according to a load balancing algorithm (e.g., round robin). Thereafter, load balance 201 may distribute received requests between central server 202 and other active dialog servers, such as server 206A, for example.

Once dialog server 206A is running, it may receive processing requests from load balancer 201. If the average load of central server 202 and dialog server 206A increases above the processing load threshold, the resource controller may request instantiation of yet more servers to handle the increasing load. For example, as illustrated in plots 302 and 303, at time t3 the average load on central server 202 (plot 302) and dialog server 206A (plot 303) increases. In one embodiment, an increase in processing requests may be received by load balancer 201, and the load balancer may attempt to balance the loading on each server by forwarding the requests to both servers. Accordingly, if requests increase, the processing load of both servers 202 and 206A would approximately increase together because load balancer 201 may act to balance the load.

Resource controller 203 may monitor the processing loads of central server 202 and dialog server 206A. As shown in plot 301, the average processing load of the combined servers increases above the threshold at time t3. Once the load increases above the threshold, resource controller 203 generates a request for more resources. The request is received by cloud management service 204, which instantiates dialog instance 206B. Once dialog server instance 206B is created, dialog server 206B registers with central server 202. Central server 202 then sends a message to load balancer 201 indicating a new dialog server 206B is available for processing received requests. Further, after the new dialog server 206B is instantiated, resource controller 203 establishes a connection to the new dialog server 206B so that resource controller may monitor the processing load. For example, as mentioned above, the dialog instance may register itself with the central instance and provide status information to central instance to indicate when it is ready to start processing. Resource controller may monitor information provided to the central instance and forwarded to the resource controller. Accordingly, the resource controller can determine that an expected dialog instance is up and running after sending a request. While this is an example approach for informing the resource controller that the dialog instance is available, it may be done in other ways. For example, the dialog instance may receive the connection information for the resource controller and send status and connection information directly to the resource controller. Plot 304 illustrates the processing load of dialog server 206B. After dialog server 206B is running at time t4, load balancer 201 may begin sending processing requests to central server 202, dialog server 206A, and dialog server 206B. Accordingly, the processing load of dialog server 206B increases at time t4, and the processing loads of central server 202 and dialog server 206A decrease. Resource controller 203 monitors the load of each server and, as illustrated in plot 301, generates an aggregated server cluster loading, which in this example is an average load that decreases at time t4 after the new dialog server 206B comes on-line. As additional processing is desired by the cluster of servers, the aggregated loading on the servers may again increase. Accordingly, resource controller may interface with the cloud computer system to create more dialog servers, as needed, to handle the desired level of processing. Therefore, additional dialog servers up to server 206N may be created and added to the cluster to dynamically increase the processing power of the server cluster. In one embodiment, the resource controller may request creation of different size dialog instances based on the loading (e.g., different processing parameters or memory parameters).

As further illustrated in plot 301, a second processing load threshold, τ2, may be specified (e.g., stored in resource controller 203). The second processing load threshold may be used to trigger the suspension (or de-instantiation) of currently running servers on cloud computing system 250. For example, if the total loading decreases below the second processing load threshold, τ2, then resource controller 203 may generate a request to suspend (e.g., turn off or shut down) one or more resources, which is sent to cloud computing system 250. Dialog instances might be shut down based on the number of users served by the instance, the age of user sessions, or randomly, for example. The request is received by cloud management service 204, and cloud management service turns off one of the dialog servers. For example, at time t5 in plots 302-304, the processing load on servers 202, 206A, and 206B decreases. Resource controller monitors the loads of each server and detects the decrease in the processing load of the server cluster as shown in plot 301. In this example, when the average processing load drops below the second threshold, τ2, resource controller 203 sends a request the cloud management service 204 to shut down dialog server 206B. As shown in plot 304, at time t6 dialog server 206B is shut down, and the network load (plot 301), which aggregates the load on server 202 (plot 302) and server 206A (plot 303), increases above the second processing threshold.

Figure 4:
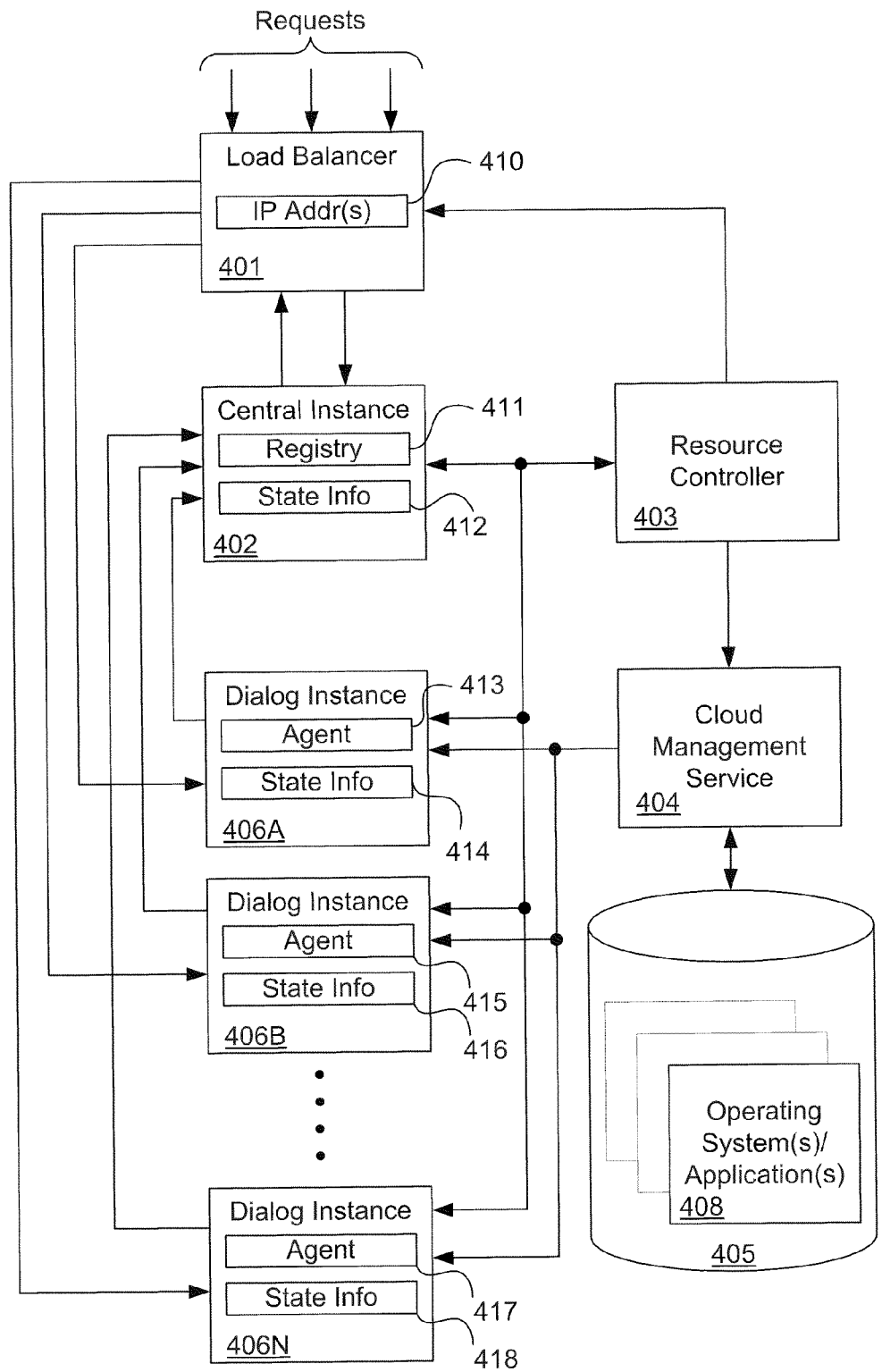
FIG. 4 illustrates a more specific example dynamic provisioning according to one embodiment of the present invention.

FIG. 4 illustrates a more specific example dynamic provisioning according to one embodiment of the present invention. In this example, a central instance server 402 may be a J2EE server such as, for example, a SAP® Netweaver® server, Tomcat server, IBM®Websphere® server, or an Oracle® BEA® Server. Requests for processing are received in a load balancer 201 and forwarded to the central server 402 for processing. A resource controller 403 is coupled to the central server 402 and load balancer 401. Resource controller monitors the processing load of central server 402 and other servers in a server cluster. In some example embodiments, the load balancer and resource controller may be included as software components on the central server. Requests received by load balancer 401 and forwarded to central server 402 may increase the processing load on the central server. As mentioned above, resource controller may include a processing load threshold that triggers the creation of new servers on a cloud computing system if the load on the server network increases above a specified level set by the processing load threshold. As more resource intensive processing requests are received by server 402, the loading may increase above the threshold. Resource controller 403 detects when the processing load threshold is surpassed, and generates a request to cloud management service 404 on cloud computer system 450. The request may include a request for resources which specifies an image on the cloud to instantiate and a parameter specifying the central instance server 402. The request may further include credentials to access the cloud management system or information to allow the system to configure load monitoring, for example. In particular, some cloud management systems may require security information, such as a two-part key, for example, to authenticate any request for any action. Such security information may be provided as a parameter in the request so that each server instance (e.g., instances 402 and 406A) may communicate with management service 404. Additionally, the request may include additional security information for creating a secure communication between each instance and the resource controller, so each central and dialog server instance can "open up" to resource controller 403. One example implementation of security codes is SNMP (Simple Network Management) utilities. SNMP utilities require security information to provide basic security. In one embodiment, a "SNMP community" name may be used to provide security to SNMP communications. SNMP configuration information may be passed to every instance on start.

Cloud computer system 450 may include a cloud management service 404 and one or more databases 405 for storing images 408. Images may include configuration information and executable code for creating running operating systems and/or applications as required to instantiate a server. Cloud management server 404 receives the request and creates an instance of one of the images in database 405. The instance may include a computer system with specified resources (e.g., CPU, memory, storage) and executable server software, for example. The instance may further receive the parameter for specifying the central instance server 402. The parameter may be the name of the central instance server 402, for example.

In one embodiment, an image for creating a dialog instance includes additional code for initializing a dialog server as part of the server cluster. For example, the image may include additional code for instantiating an agent program as a component of the dialog server or as a separate program that works with the dialog server. In FIG. 4, a request for additional resources received from the resource controller results in the instantiation of dialog instance 406A, which includes an agent software component 413. Agent 413 may execute a script for establishing a connection with the central instance 402, registering the dialog server, or providing a status signal. For example, when dialog server 406A is instantiated, agent 413 may automatically execute. First, agent 413 may use the received parameter specifying the central server 402 to establish a connection to server 402. For example, the agent may receive a name of the central server and translate (or resolve) the name into an address of the central server, which may be used to connect to the central server. Central server 402 may include a registry 411 for storing specifying the dialog servers that are available on the cloud. Once agent 413 creates a connection to central server 402, agent 413 may send a message over the connection to server 402 to register dialog server 406A in the registry. Furthermore, agent 413 may send a status message to central server 402 indicating the dialog server 406A has completed an initialization (or boot up) process and is available to process requests. The message may be received in a message queue (See FIG. 7) and processed. In response to being notified that dialog server's status is available for processing, central instance server 402 may send a message to load balancer 401. The message may include the address (e.g., the internet protocol address or "IP address") of dialog instance 406A, for example, so that load balancer 401 has the requisite connection information to distribute requests to both central server 402 and dialog server 406A. Furthermore, resource controller 403 may connect to dialog server 406A to monitor its processing load.

In this example, resource controller 403 is coupled to load balancer 401, central server 402, and dialog server 406A. Generally, once dialog server 406A is running, it is available to receive incoming requests from load balancer 401. In different embodiments, load balancer may be a hardware load balancer or a software load balance. In one embodiment, load balancer is a software component included as part of the central server instance 402, for example. Load balancer 401 may include a plurality of Internet Protocol Addresses ("IP Addresses") 410 of servers that are available to process received requests. As new requests are received, load balancer 401 may distribute the requests to difference available servers using a round robin approach described above (e.g., first request to the central server, second request to the dialog server, third request to the central server, etc. . . . ), or it may distribute requests based on load information received from the resource controller 403, to name just two example distribution schemes.

As new requests are received by load balancer 401, the requests may be distributed between servers 402 and 406A as described above. However, initially, central server 402 will have a much higher load than dialog server 406A. Accordingly, the server cluster may benefit from processing load equalization. In one embodiment, resource controller 403 may move a portion of the load on the existing servers to the new server to balance the loading across the server cluster. For example, after resource controller 403 has established a connection to both central server 402 and dialog server 406A, it may temporarily suspend certain processing activity on central server 402 for relocation to the new dialog server 406A. For example, a typical server will execute processing tasks for multiple different users. Each processing task for each user may have associated state information. For instance, central server 402 may include state information 412 corresponding to the execution of one or more computer programs. As described in more detail below, state information may be moved to new dialog servers to equalize the load across the cluster. In particular, state information for specified users may be sent from central server 402 to dialog server 406A so that dialog server 406A may complete the processing tasks for the specified users. In this manner, the processing load between the central server and the dialog server may be equalized. Alternatively, resource controller 403 may separately monitor the processing load on each individual server, and send an instruction to load balancer 401 wherein incoming requests are directed exclusively to the new dialog server 406A until the difference between the processing loads on the new dialog server and one or more of the other currently running servers is within a predetermined level. In the example of FIG. 4, after dialog server 406A is running, resource controller 403 may signal load balancer 401 to suspend sending further processing requests to central server 402 and send all incoming requests to dialog server 406A until a difference in the processing loads of server 402 and server 406A is within a predetermine level. Similarly, if a dialog server is being suspended (shut down) for insufficient loading, resource controller 403 may signal load balancer 401 to block all further requests to the server being shut down. For example, if resource controller 403 detects that the load of the server cluster falls below a processing load threshold, as described above, it may generate a first request to the cloud to turn off a dialog server, and it may generate a second command to load balancer to block further requests from being sent to the server being shut down. As one specific example, resource controller may remove the IP address of the dialog server being shut down from the IP address list stored in the load balancer.

Figure 5:
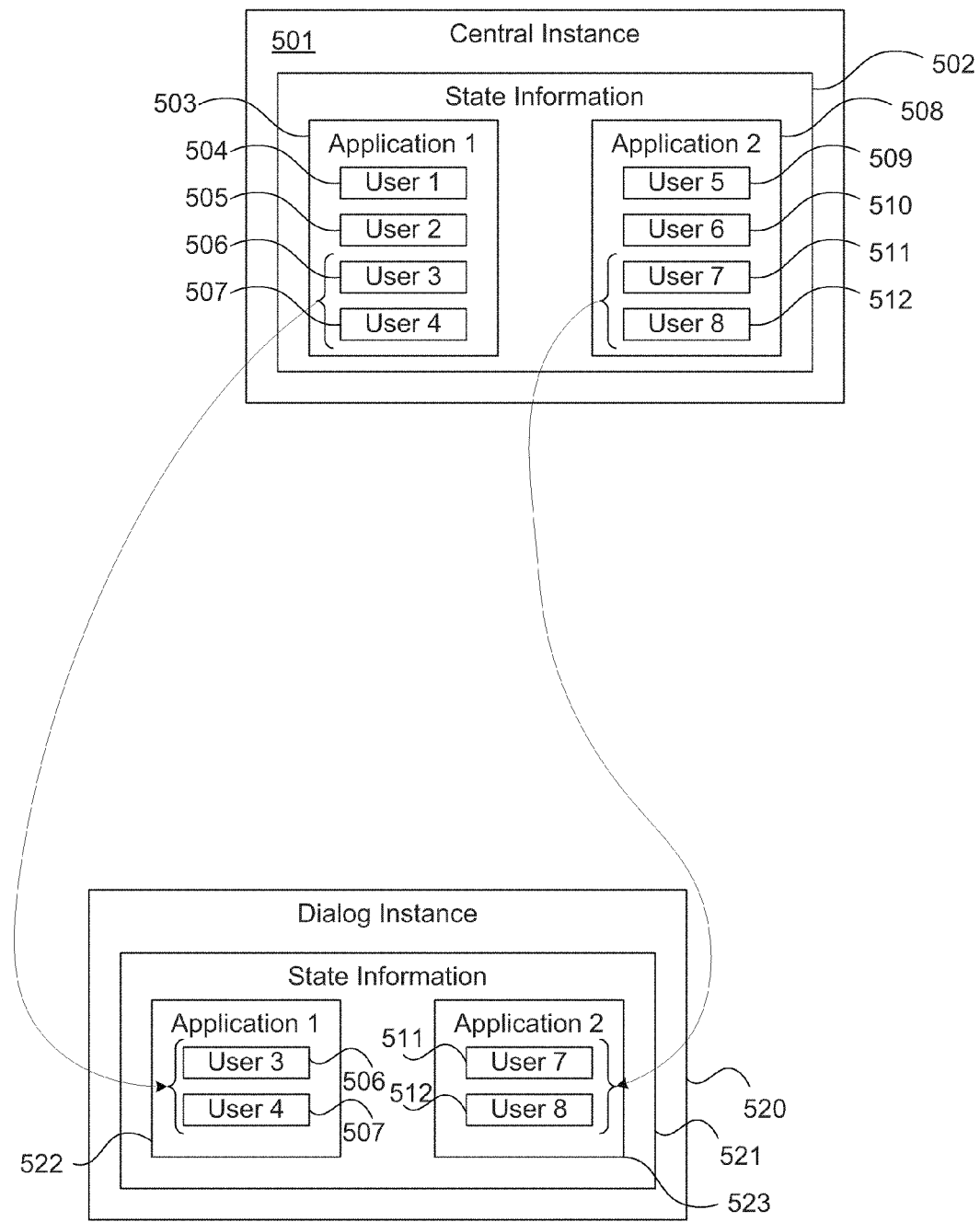
FIG. 5 illustrates redistribution of processing according to one embodiment of the present invention.

FIG. 5 illustrates redistribution of processing according to one embodiment of the present invention. In this example, a central server instance 501 includes state information 502. Here, central server instance 501 may be executing two applications, and each application may have corresponding state information. Further, state information for each application may be partitioned separately for different users. For example, a first application may have corresponding application state information 503 ("Application 1"), which may include state information 504 for a first user ("User 1"), state information 505 for a second user ("User 2"), state information 506 for a third user ("User 3"), and state information 507 for a fourth user ("User 4"). Similarly, a second application may have corresponding application state information 508

Figure 6:
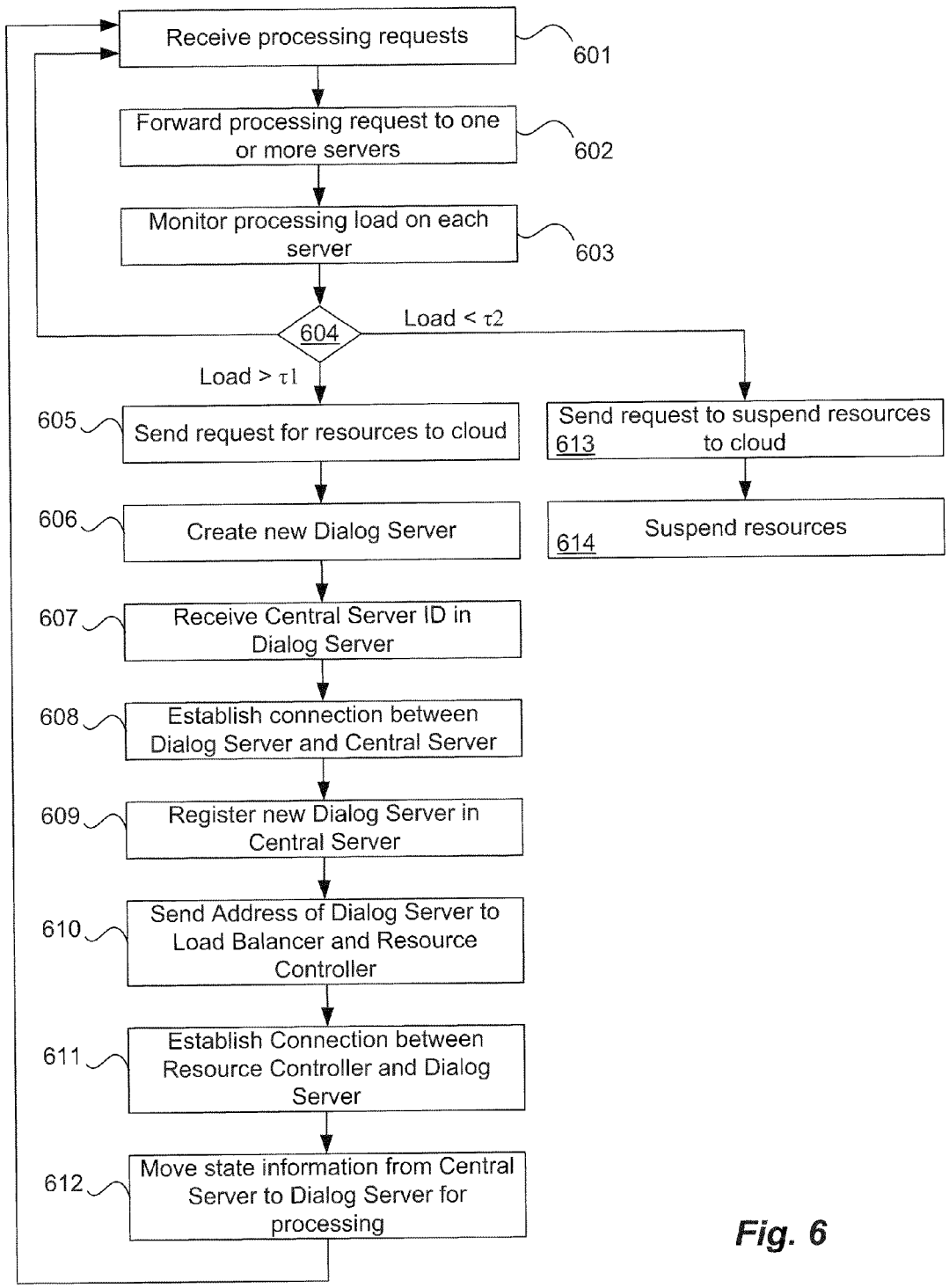
FIG. 6 illustrates a dynamically provisioning process according to one embodiment of the present invention.

("Application 2"), which may include state information 509 for a fifth user ("User 5"), state information 510 for a sixth user ("User 6"), state information 511 for a seventh user ("User 7"), and state information 512 for an eighth user ("User 8"). If user requests cause the processing load to increase above a threshold, a dialog server instance 520 may be created and a subset of the state information from central server 501 may be moved to dialog server 520. For example, a new instance of dialog server 520 may be configured to execute Application 1 and Application 2. Users may be seamlessly moved from a loaded server to a new server. In this example, state information a subset of users may be moved to the dialog server 520 for execution. Here, state information for user 3 506 and user 4 507 of Application 1 are moved from the central server to the dialog server to equalize the load on the central server. Similarly, state information for user 7 and user 8 of Application 2 are moved from the central server to the dialog server to equalize the load on the central server FIG. 6 illustrates a dynamically provisioning process according to one embodiment of the present invention. At 601, processing requests are received by a system including one or more software servers. At 602, the processing requests are forwarded to one or more servers. For example, the processing requests may be received by a load balancer hardware or software component and each request may be sent to multiple different servers. At 603, the processing load on each server is monitored. At 604, the processing load may be compared to a threshold. For example, the processing loads of each server may be combined according to an algorithm and, if the resulting combined metric representing the load of the server cluster is greater than a first threshold (e.g., an upper processing load boundary), then a request for resources is sent to a cloud computing systems at 605. Alternatively, if the resulting combined metric representing the load of the server cluster is less than a second threshold (e.g., a lower processing load boundary), then a request to suspend resources is sent to a cloud computing systems at 613 and the resources are suspended at 614. In one embodiment, the combination is an average, for example. If the load is below a first threshold and above a second threshold, then the system continues receiving and forwarding requests to the servers, and monitoring the load. At 606, a new dialog server is created on a cloud system in response to receiving the request at 605. At 607, a central server identification (ID) is received an agent operating in conjunction with the dialog server. At 608, a connection is established between the dialog server and the central server using the central server ID. At 609, the dialog server registers with the central server. At 610, an address of the dialog server is sent to a load balancer and resource controller. At 611, a connection is established between the resource controller and the dialog server. At 612, state information may be moved from the central server to the dialog server for processing. The process then returns to 601 wherein the system receives processing requests to be executed on the dialog server or central server.

Figure 7:
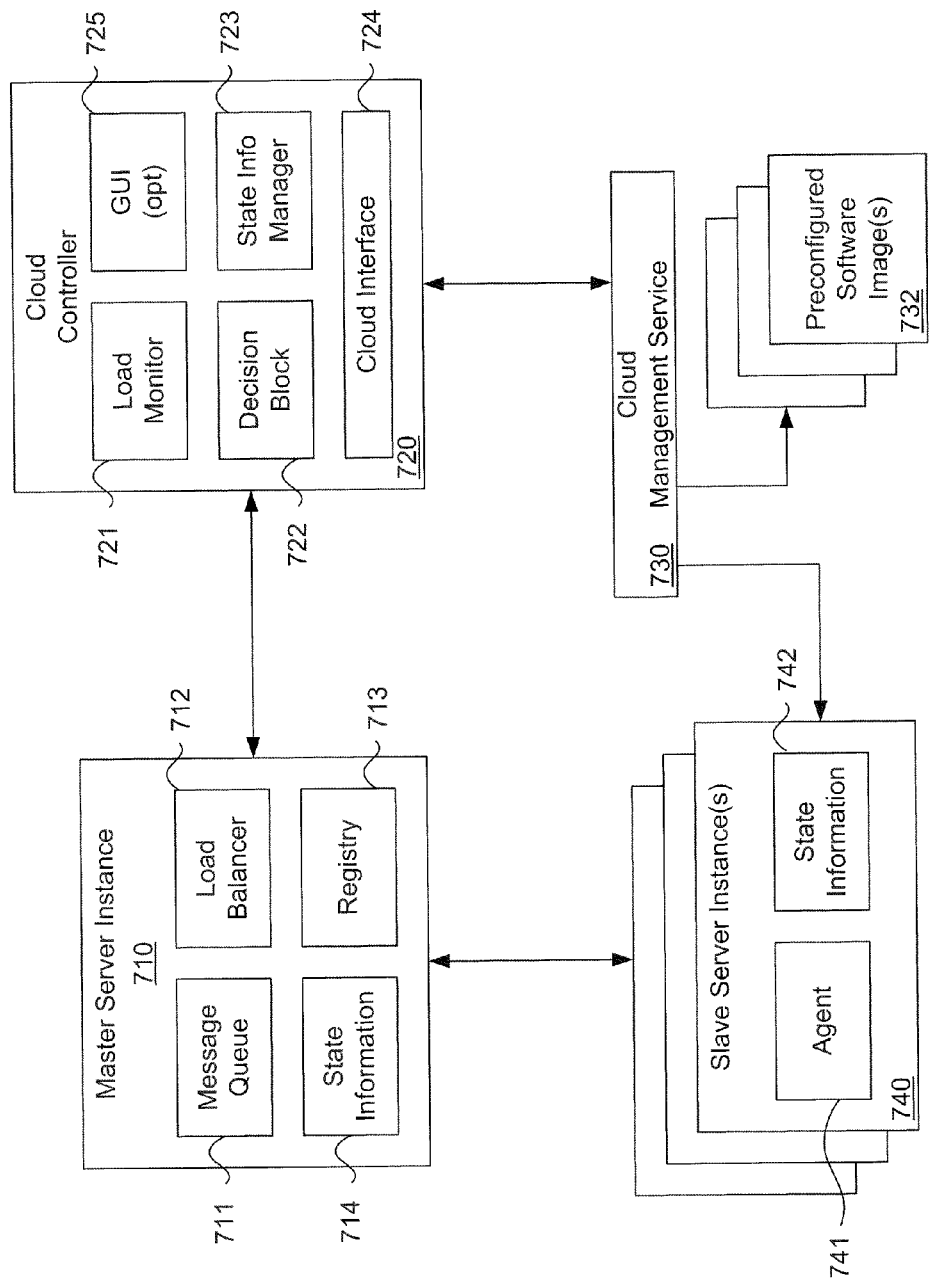
FIG. 7 illustrates a dynamic provisioning software architecture according to one embodiment of the present invention.

FIG. 7 illustrates a dynamic provisioning software architecture according to one embodiment of the present invention. In one embodiment, the present invention may include a computer system programmed to perform the techniques described above. A computer system, including one or more computers, may be programmed with a plurality of software components. In this example, a computer system is programmed with a cloud controller software component 720, master server instance 710, cloud management service software component 730, and slave server instances 741. The master server instance 710 may store information about slave server instance's 741 configuration, and may control the load of each slave server instance 741, for example. Accordingly, server instance 710 is referred to as the "master" instance and server instances 741 are referred to as the "slave" instances because they are dependent on the master. A master server instance 710 may be created from a preconfigured software image stored in one or more databases residing on a computer readable medium, such as a hard disk drive. The databases may store a plurality of images 732 that may be accessed and instantiated by cloud management service 730 (e.g., a web service). Master server instance 710 may include a message queue software component 711, a load balancer software component 712, state information 713, and a registry 714. Message queue 711 may receive messages from slave server instances as they are received and store the messages for processing by master server instance 711 in the order they are received, for example. Load balancer 712 may receive requests and distribute the requests across the master server instance 710 and slave server instances 740. As requests are received and processed by the master server 710, state information 714 may be generated and stored with the system. In one embodiment, state information 714 for different users may be stored together as separate partitioned data for each user, and when a new slave server is created, state information for one or more users of master server may be moved to another server for use in executing user processing. Master server may further include a registry component, which may store the name of each slave server, an address of each slave server, and a status of each slave server (e.g., on/off).

Cloud controller software component 720 may include a load monitor software component 721 for monitoring the processing load of the master server and slave servers. Load monitor 721 may receive connection information, such as an IP address and a port number, for connecting to the master server instance 710 and one or more slave server instances 720 and retrieving the processing load of each server. Load monitor 721 may further connect to the load balancer 712 to monitor requests received by the system or send the load balancer processing load information for each server so that load balancer may distribute received requests based on the load of each individual server in the system. Processing load information in load monitor 721 may be sent to a decision block software component 722. Decision block 722 may apply an algorithm to determine if new slave servers should be created or if existing slave servers should be terminated. As described above, decision block 722 may aggregate the total load of the master server and all slave servers in the logical network, and if the aggregated load is above a threshold, decision block 722 may generate a signal to create a new slave server on a cloud computer system. If the aggregated load is below a threshold, decision block 722 may generate a signal to shut down a slave server on a cloud computer system. In one embodiment the aggregation may be an average of all the processing loads on the master server and all active slave servers working together to process requests received by load balancer. If decision block determines that a new server instance is needed for processing network requests, or if a server should be shut down, then a signal may be sent to cloud interface software component 724. Cloud interface 724 may include software for interfacing with cloud management service 730, including software for generating a request to cloud management service 730 to instantiate additional resources on the cloud. Cloud controller 720 may further include a state information manager 723. State information manager software component 723 may, in response to generating a request for additional resources, move a subset of the total state information for one or more particular users on an active server to another newly instantiated server after the server is created. In one embodiment, cloud controller 720 may include a graphical user interface (GUI) to allow a user to monitor the loading of each server instance, the requests received, and/or the distribution of requests, for example.

Cloud management service 730 may receive requests from controller 720 and access preconfigured software images 732 to instantiate slave server instances 740. In one embodiment the images include program code for creating an agent 741 for performing the communication functions with the master server as described above. State information 742 for a particular user may be moved onto a slave server after the slave server is created, and processing requests that use the particular user's state information may be carried out on the new slave server. It is to be understood that the above example is just one possible configuration of the software components described above. The software components may be moved between the blocks described above or separated into one or more additional stand alone blocks.

FIG. 8 illustrates hardware of a special purpose computing machine configured with a dynamic provisioning process according to one embodiment of the present invention. As mentioned above, the software servers together may form a cluster, or logical network of computer systems programmed with software programs that communicate with each other and work together to process requests. An example computer system 810 is illustrated in FIG. 8. Computer system 810 includes a bus 805 or other communication mechanism for communicating information, and a processor 801 coupled with bus 805 for processing information. Computer system 810 also includes a memory 802 coupled to bus 805 for storing information and instructions to be executed by processor 801, including information and instructions for performing the techniques described above, for example. This memory may also be used for storing variables or other intermediate information during execution of instructions to be executed by processor 801. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 803 may include source code, binary code, or software files for performing the techniques above, for example. Storage device and memory are both examples of computer readable mediums.

Computer system 810 may be coupled via bus 805 to a display 812, such as a cathode ray tube (CRT) or liquid crystal display (LCD), for displaying information to a computer user. An input device 811 such as a keyboard and/or mouse is coupled to bus 805 for communicating information and command selections from the user to processor 801. The combination of these components allows the user to communicate with the system. In some systems, bus 805 may be divided into multiple specialized buses.

Computer system 810 also includes a network interface 804 coupled with bus 805. Network interface 804 may provide two-way data communication between computer system 810 and the local network 820. The network interface 804 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 804 sends and receives electrical, electromagnetic, or optical signals that carry digital data streams representing various types of information.

Computer system 810 can send and receive information, including messages or other interface actions, through the network interface 804 across a local network 820, an Intranet, or the Internet 830. For a local network, computer system 810 may communicate with a plurality of other computer machines, such as server 815. Accordingly, computer system 810 and server computer systems represented by server 815 may form a cloud computing network, which may be programmed with processes described herein. In the Internet example, software components or services may reside on multiple different computer systems 810 or servers 831-835 across the network. The processes described above may be implemented on one or more servers, for example. A server 831 may transmit actions or messages from one component, through Internet 830, local network 820, and network interface 804 to a component on computer system 810. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A cloud computing system comprising a computer system, wherein the computer system comprises a processor and a memory, the memory having executable code stored thereon that when executed by the processor performs a method, the method comprising:
   specifying configuration information for creating one or more first software application servers, wherein the configuration information are stored as images on the cloud computing system;
   specifying a first processing load threshold;
   specifying a second processing load threshold;
   continuously monitoring a processing load on one or more second software application servers, the second software application servers including a central application server;
   generating a request to the cloud computing system to instantiate an instance of one of said images if the monitored load exceeds the first processing load threshold, wherein the request to the cloud computing system comprises an identification of the central application server;
   creating a first application server instance on the cloud computing system in response to the request, wherein said identification is used to establish a connection between the first application server instance and the central application server;
   registering the first application server instance with the central application server;
   distributing the processing load across the one or more second software application servers and the first software application server instance; and
   monitoring the processing load on the one or more second software application servers and the first software application server instance, wherein the processing load is monitored separately on each server, and wherein distributing the processing load across the one or more second servers and the first software application server instance is based on the monitored load of the one or more second servers and the first software application server instance;

generating a second request to the cloud computing system to de-instantiate the first software application server instance or one of the second software application servers, but not the central application server, if the monitored processing load is below the second processing load threshold; and suspending said first software application server instance or said one of the second software application servers on the cloud computing system in response to the request.

2. The cloud computing system of claim 1 wherein the one or more servers form a logical network, and wherein the created first software application server instance becomes part of the logical network.

3. The cloud computing system of claim 1 wherein the distributing is performed by a load balancer.

4. The cloud computing system of claim 1 further comprising repeating the generating, creating, and distributing steps.

5. The cloud computing system of claim 1 further comprising moving state information for a first user from the central application server to the first application server instance.

6. The cloud computing system of claim 1 wherein the central application server includes state information for a plurality of users.

7. A computer system comprising a processor and a computer readable medium embodying a computer program, that when executed by the processor performs a method, said method comprising:

specifying configuration information for creating one or more first software application servers, wherein the configuration information are stored as images on a cloud computing system;

specifying a first processing load threshold;

specifying a second processing load threshold;

continuously monitoring a processing load on one or more second software application servers, the second software application servers including a central application server;

generating a request to the cloud computing system to instantiate an instance of one of said images if the monitored load exceeds the first processing load threshold, wherein the request to the cloud computing system comprises an identification of the central application server;

creating a first application server instance on the cloud computing system in response to the request, wherein said identification is used to establish a connection between the first software application server instance and the central application server;

registering the first application server instance with the central application server;

distributing the processing load across the one or more second software application servers and the first software application server instance;

monitoring the processing load on the one or more second software application servers and the first software application server instance, wherein the processing load is monitored separately on each server, and wherein distributing the processing load across the one or more second servers and the first software application server instance is based on the monitored load of the one or more second servers and the first application server instance;

generating a second request to the cloud computing system to de-instantiate the first software application server instance or one of the second software application servers, but not the central application server, if the monitored processing load is below the second processing load threshold;

suspending said first application server instance or said one of the second software application servers on the cloud computing system in response to the request.

8. The computer system of claim 7 wherein the one or more second servers form a logical network, and wherein the created first software application server instance becomes part of the logical network.

9. The computer system of claim 7 wherein the distributing is performed by a load balancer.

10. The computer system of claim 7 further comprising repeating the generating, creating, and distributing steps.

11. The computer system of claim 7 further comprising moving state information for a first user from the central application server to the first application server instance.

12. The computer system of claim 7 wherein the central application server includes state information for a plurality of users.

* * * * *